BEAM SWITCHING TUBES

Filed Sept. 7, 1954

INVENTOR
SIN-PIH FAN
BY
Laurence R. Brown
ATTORNEY 2,806,979
Patented Sept. 17, 1957

1

2,806,979

BEAM SWITCHING TUBES

Sin-pih Fan, Philadelphia, Pa.

Application September 7, 1954, Serial No. 454,287
10 Claims. (Cl. 315—21)

This invention relates to magnetron type beam switching tubes and operation and particularly to magnetron type flip-flop tubes together with circuits and methods for operation thereof.

Multi-vibrator type flip-flops which are driven by triggering signals or pulses form basic building blocks which are widely used as gates or delay means in computer, radar, test equipment, and many other electronic equipment applications. Multi-vibrator type flip-flops, whether using tubes, transistors, or other tube substitutes, are feed-back controlled devices. Therefore, the switching characteristics are determined by the circuit parameters which also control the amount of feed back.

To be reliable in operation, the multi-vibrator flip-flop also must be designed for the specific characteristics of the triggering pulse which is to control it, since the switching action of the device is sensitive to the slope, duration, and amplitude of the triggering pulse.

If the flip-flop is to switch at high speeds of the order of several megacycles per second, the basic multi-vibrator becomes sensitive to its own output wave shapes and must have additional tubes and circuitry supplied to insure that the output waveforms which control the speed of switching have specified shapes. In addition to the extra tubes and circuitry needed to provide the high switching speed, it is essential that the device be used in conjunction with a regulated power supply.

It is apparent, then, that high speed multi-vibrator type flip-flops are complex and, with respect to their relatively simple function, bulky, as well as expensive to construct. Also, the circuit parameters necessary to provide proper switching action restrict the output load impedance of the device to certain limits which are not necessarily compatible with the impedance of the device to which the flip-flop output is to be coupled, which may in turn dictate further buffer coupling stages.

From the foregoing, it can be seen that the flip-flop can be termed as above a "basic building block," only so long as the triggering pulse is the same in each part of the circuit where the flip-flop is used. As a practical matter, any standardized triggering or control pulse deteriorates and becomes distorted both in shape and amplitude as it passes through an electronic system. In order to permit the use of a "basic" flip-flop unit in all parts of a circuit rather than design a new flip-flop to accommodate the waveform of the control pulse at each point where a flip-flop is needed, pulse shaping networks and amplifiers are utilized at critical circuit locations to maintain a "standard" control or triggering pulse throughout a system. Pulse shapers and pulse amplifiers, though necessary in the prior art, do not form part of the basic circuitry and represent excess baggage which is expensive to construct and maintain.

Since most multi-vibrator type flip-flops utilize conventional receiving type tubes, other factors limit the reliability of operation of these devices than those mentioned above. For one thing, the contact potential of tubes changes during the life of the tube, due to sublimation of cathode material onto the grid or grids, thereby changing the tube characteristics and affecting the switching rate or reliability of switching. Tube life is also adversely affected by back bombardment of the cathode by positive ions.

2

A third factor which adversely affects the reliability of multi-vibrator type flip-flops is sleeping sickness in the tube. Sleeping sickness is the term used to indicate that the tube fails to respond to a short triggering pulse, especially the first pulse of a series of pulses, after the tube has been dormant or non-conductive for a time. Since in computer circuits the programming often is such that some flip-flops are pulsed only occasionally, sleeping sickness in a tube introduces errors which are very difficult to track down because the tube may not exhibit the same effect for a considerable period of time.

Accordingly, a principal object of the present invention is to provide improved beam switching tubes and operational methods.

Another object of this invention is to provide an improved beam switching tube which is capable of operation at high speeds with a simple input trigger pulse and which requires little external circuitry.

A further object of the present invention is to provide an improved flip-flop tube whose output load circuit impedance may have a large range of values.

Yet another object of the present invention is to provide an improved beam switching tube in which the switching action is substantially independent of the duration and amplitude above a certain minimum, the slope or the duration of the triggering signal applied thereto.

An additional object of the present invention is to provide an improved flip-flop unit which is less bulky and requires less external circuitry than prior art types which operate at comparable switching speeds.

An ancillary object of the present invention is to provide an improved flip-flop unit in which switching characteristics are relatively unaffected by changes in contact potential.

Still another object of the present invention is to provide an improved flip-flop tube, the operation of which is relatively unaffected by bombardment of the cathode by positive ions.

A still further object of the present invention is to provide an improved flip-flop tube that is not subject to sleeping sickness.

Magnetron type multiple position beam switching tubes of conventional type usually comprise an array of spade electrodes concentrically disposed about an elongated thermionic cathode, with one or more electron receiving electrodes disposed beyond the spade electrodes. The individual spade electrodes usually have a somewhat U-shaped cross sectional configuration with the base of the U facing the cathode, and the spades are normally coextensive in length with the cathode. The tube is surrounded by means, usually a permanent magnet, for providing a magnetic field which permeates the tube in lines substantially parallel to the longitudinal axis of the cathode and spades. The potential of all the spades, under the condition where the electron beam formed within the tube returns to the cathode, is positive with respect to the cathode. If, however, the potential of one of the spades is lowered to, at or near the potential of the cathode, the balance between the electrostatic and magnetic fields is changed in the area between these electrodes and the electron beam is formed between the cathode and an edge of the spade having the lowered potential. The target electrodes, whatever their particular physical configuration may be, are disposed beyond the spades in the path of at least a portion of the electron beam which is formed by lowering the potential of a spade.

In accordance with the present invention a flip-flop tube is provided which utilizes such a magnetron type of multiple position beam switching tube. Only two output targets are provided in a basic flip-flop tube embodiment of the present invention having two stable states. These targets have an L-shaped cross sectional configuration and are disposed beyond the spades and in the path of the electron beam or stream with one arm of the L being interleaved between the extended arms of an adjacent U-shaped spade. With the spades arranged in a circular array, the targets are located approximately on opposite sides of the array of spades from one another.

In a tube embodiment having six spades and two output electrodes, the spades are connected to a source of voltage which is positive with respect to the cathode in the following manner reading around the array of spades: The first and second spades which function together as beam holding spades are connected to the positive potential source through the spade lead impedance comprising a resistor. These spades are termed bistable state spades since they either lock-in the beam at a fixed position when lowered in potential or cause the beam to flow elsewhere when raised in potential. Current from the beam flowing through the spade load impedance causes the potential to remain low and keeps the beam locked-in to its stable position. The next spade is an unstable spade and it is connected to the source of positive potential through a low enough spade load impedance that the beam does not lock-in as distinguished from the bistable state spades. The fourth and fifth spades are bistable state spades, as were the first and second spades, and the sixth is another unstable state spade like the third.

A sheet-like switching plate is located behind each of the unstable state spades, and a sheet-like channel plate having bent edges is bridged across each of the unstable state spades and associated switching plate. This channel plate is interleaved with the side of the bistable state spade on either side of the unstable state spade. This structure forms a channel which may be gated by electric field potentials to pass the beam from an unstable spade to a succeeding bistable spade.

The L-shaped targets previously mentioned are so disposed that electrons passing between two adjacent bistable state spades will impinge thereon. A rod-like switching electrode is positioned adjacent to one of each pair of the two adjacent bistable state spades to cause the beam to switch away from its stable position. This switching electrode is connected with the switching plate. The electrodes are connected with proper potentials to form a field such that the leading edge of a negative triggering input wave or pulse to the switching electrode will cause the beam to switch from one stable position to its intermediate semi-stable position where it is held as long as the switching pulse remains negative, and the positive level at the trailing edge of the same waveform will cause the beam to proceed to its unstable position from which it is directed to a succeeding stable position.

Briefly, the functioning of the flip-flop is as follows: Assume the electron stream or beam to be locked in or held at the leading edge (that edge which is furthest in the direction the magnetic field tends to rotate the beam) of a first bistable state spade. The electron stream is locked-in at the spade because the voltage drop across its load impedance maintains the spade at a potential near the cathode potential. A negative input pulse is then applied to the flip-flop simultaneously at each rod-like switching electrode and each channel plate. The negative input pulse causes the beam to advance to the second stable state spade, where it is held in the semi-stable beam position as long as the input pulse remains at a negative level. The beam cannot advance beyond that point because the third spade is an unstable state spade which cannot hold the beam. Although a passageway exists between the switching plate behind the third spade and the channel plate which lies adjacent thereto, the channel plate is biased negatively by a bias source and the switching plate is maintained at the negative potential of the input pulse. This potential condition of these two electrodes, which form a passageway between the second spade and the fourth spade is such that electrons cannot pass therethrough. Thus, the beam remains locked in on the second spade in the semi-stable beam position so long as the input pulse is negative. When the input pulse ends, or, more accurately, as the amplitude of the input pulse decreases to a switching value which depends on tube parameters, the electron beam passes through the passageway, impinges on the fourth spade, which is another bistable state spade, and locks in on the leading edge thereto. Thus the beam passes through its unstable position and proceeds to a further stable position to thereby provide an output signal on the target electrode positioned in the path of electrons of the beam which pass between the fourth and fifth spades. This completes the flip-flop action in switching from one output electrode to another. The switching of the beam back from the second to the first output electrode is accomplished in a similar manner.

The switching of the electron beam from one output position to another is dependent only upon the input triggering pulse amplitude being larger than the minimum potential required to both cause the beam to shift and to close the passageway between the channel plate and the switching transfer plate. Thus, the waveform and duration of the input triggering pulse (exceeding the minimum requirements) has no effect on the reliability of the switching of the beam from one output position to another.

Because the output of the flip-flop of the present invention is not coupled back to the input circuit as is the case with multi-vibrator type flip-flop; the switching action is not affected by the output waveform. Therefore, the output circuit of the flip-flop may be determined entirely by the requirements of the circuits to which the flip-flop is to be coupled.

Switching or flip-flop tubes made in accordance with the present invention are capable of high switching rates of the order of several megacycles. The upper frequency limit is defined by circuit capacity, and because of the relatively large spacings between electrodes, interelectrode capacitances and internal feedback is small.

Further, because the switching action is quite un-critical as to voltage amplitude variations of the triggering pulse or tube operating potentials, regulation of power supplies is not required to the extent necessary heretofore.

Another advantage of flip-flops made in accordance with the present invention is that although the triggering pulse applied to the flip-flop may be of any form, the output pulse of the flip-flop is a well formed rectangular wave which usually requires no external wave shaping network to alter its form.

Flip-flops made in accordance with the present invention are, therefore, true basic building blocks for computers since they do not require specially shaped input waveforms or output load circuits. Also, the spade load impedances may be incorporated into the tube envelope and other than operating potentials only the input and output load impedances (which it is desirable to be able to choose to satisfy other circuit requirements) need be coupled to the tube to provide a complete flip-flop unit. Thus, flip-flops made in accordance with the present invention are reduced to tube size plug-in units and require little, if any, pulse shaping networks or amplifiers preceding the flip-flop. Such flip-flops are also easily replaceable.

Because beam switching tubes made and operated in accordance with the teachings of the present invention are magnetron type tubes, other advantages over conventional type vacuum tubes accrue. There is no grid or any other electrode positioned close to the cathode, and therefore there is no contact potential problem. Back bombardment of the cathode apparently is reduced due to the motion given the ions by the magnetic field which permeates the tube. Sleeping sickness, presumed to be caused in conventional tubes by an interface developing on the cathode, has not been found to occur in magnetron beam switching tubes, apparently because electrons are continuously emitted from the cathode even when they are not directed to an output target electrode.

While the present invention has been described most particularly in connection with flip-flop units, tubes made in accordance with the present invention may be advantageously used as counter or commutator tubes since the beam advances only one position regardless of the shape, maximum duration or maximum amplitude of the input pulse or wave. In prior art tubes it has been necessary either to carefully control the width and shape of the input pulse, or to use external circuit means such as a flip-flop for alternately directing input pulses to sets of alternating switching electrodes thereby restricting the advancement of the electron beam to a single position for each trigger pulse.

The above and other additional objects and advantages will be best understood from the following description when read in connection with the accompanying drawings, in which.

Figure 1:
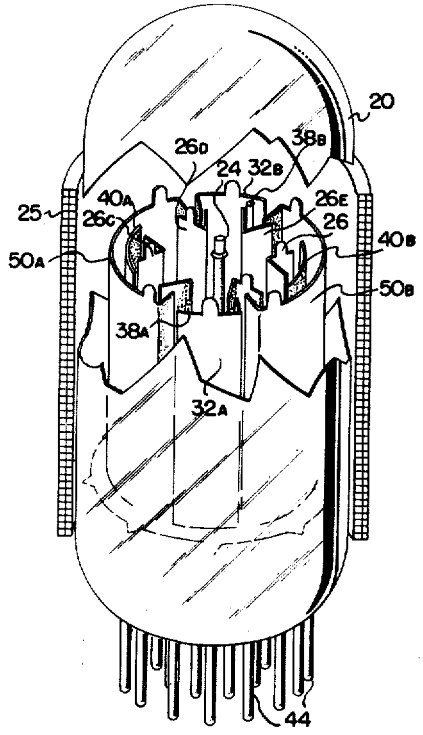
Fig. 1 is an isometric view, partly in section, of a two position beam switching tube made in accordance with the present invention.
Figure 2:
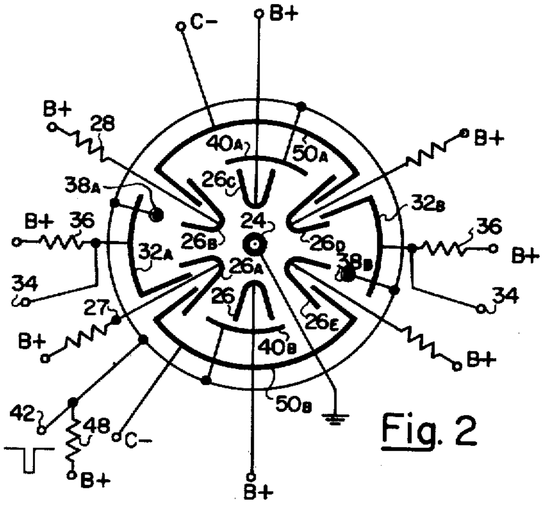
Fig. 2 is a schematic view of a flip-flop tube and associated circuitry of the invention.

Referring to Figures 1 and 2, the tube 20 has within a hermetically sealed envelope 22, a centrally disposed cathode 24 which is shown as an indirectly heated cathode but which could also be of the filamentary or other equivalent type. Surrounding the cathode 24 is an array of spade electrodes 26. The external magnet 25 concentrically surrounds the envelope 22 to provide magnetic flux lines parallel with the cathode. The spades 26 have a U or trough shaped transverse cross section and usually are coextensive in length with the cathode 24. The open sides of the spades extend generally outwardly from the central portion of the tube and the base of the U faces inwardly towards the cathode 24 of the tube. Six spade electrodes are disposed substantially equi-distantly one from another to form a cylindrical array, as illustrated, but unequal spacing between the spades may be used if desired to satisfy particular design requirements. Likewise, the spades 26 need not necessarily be identical in size and shape, although for the sake of symmetry of design and economy of fabrication the spades are usually identical. However, the size of the spades and the spacing between spades do affect the electric field characteristics and therefore the time the beam takes to switch from one stable beam position to another.

Each of the spades in sub-set 26*a*, 26*b*, 26*d*, and 26*e* have a resistive impedance member 28 connected between the spade and a source of positive potential (labeled B+) and will be termed bistable spades since the members 28 operate to hold the beam in a stable position by maintaining a reduced potential due to beam current flow. Spades 26*c* and 26 are unstable spades, since they are connected directly to the source of B+ positive potential and therefore do not lock the beam into position but permit it to freely rotate in the direction which is dictated by the polarity of the magnetic field.

An output target electrode 32*a* bridges the space between spades 26*a* and 26*b*, but is insulated from the spades. A similar output target electrodes 32*b* bridges the space between the spades 26*d* and 26*e*. Each of the target electrodes 32*a* and 32*b* are connected to a source of positive potential labeled B+ through a resistive output impedance 36. The output signal or potential denoting the state of the flip-flop is developed across this output impedance 36 and is coupled to an output terminal 34. A rod-like beam switching electrode 38*a* maintained at a positive potential is disposed between the edge of spade 26*b* which is adjacent to spade 26*a* and the target electrode 32*a*, for removing the beam from a stable locked-in position upon a reduced potential from an external switching pulse. Another beam switching electrode 38*b* is similarly disposed with respect to spade 26*e* and target electrode 32*b*. A switching plate 40 is disposed behind and adjacent to each of the unstable spades 26 and 26*c*. The switching plates 40 are coextensive in length with the spades and are connected, as are the switching electrodes 38*a*, 38*b*, to the input terminal 42 which may be one of the base pins 44 of the tube 20. The input terminal 42 is maintained at a positive B+ potential 46 through the resistive impedance element 48 in the absence of a switching pulse.

A channel plate 50, which in appearance is like two mirror imaged target electrodes 32 joined together at the center with the bent portions at opposite ends, is disposed beyond each switching plate with respect to the cathode. The bent ends of the channel plate 50*a* are interleaved with the ends of spades 26*b* and 26*d* which lie adjacent to the spade 26*c* in order to minimize the possibilities that electrons from the beam might escape to other portions of the tube. The spacing between the switching plate 40*a* and the channel plate 50*a* should be of the same order as the closest spacing between two adjacent bistable spades. That is, the above mentioned spacing should be wide enough to pass the electron beam. Another channel plate 50*b* is similarly disposed with respect to switching plate 40*b* and spades 26*e*, and 26*a*. Each of the channel plates is coupled to a negative potential source labeled C—, and thus with the accompanying tube structure serves to form a passageway. In this passageway, the beam is locked out by means of an electric field formed by the effect of the negative level of an input trigger pulse derived from an external circuit and is passed or gated by the positive level generally reached as the trailing edge of the input pulse occurs, as will be explained hereinafter in more detail.

The operation of the tube 20 is similar in many respects to more conventional magnetron type multiple position beam switching tubes. A magnetic field which has lines of force extending substantially parallel to the cathode 24 is provided by the hollow cylindrical magnet 25 which may be either a permanent magnet or an electromagnet or a combination of the two. Each of the spades is maintained, under no signal conditions where the electron beam is not impinging on any spade, at a positive potential (with respect to the cathode 24) by the potential source B+. Under this static condition, the relationship between the electrostatic field existing between the cathode 24 and the spades (and to a lesser extent those electrodes disposed beyond the spades) and the magnetic field is such that the electrons emitted from the cathode 24 follow curved paths around the cathode and substantially no electrons impinge on the spade or other outer electrodes. This is the familiar magnetron cutoff condition.

Each of the transfer plates is maintained at a negative bias potential. Because of the intervention of the spades between the transfer plate and the cathode, the fact that the transfer plates are maintained at a low potential has little effect on beam formation caused by the electrostatic field-magnetic field relationship previously referred to.

The switching electrodes 38 and the switching plates 40 as previously mentioned, are conductively connected together and to the input terminal 42, which is maintained at a positive potential (less than the potential source which supplies the spade electrodes 26).

Initially, it will be assumed that the electron beam or stream is locked-in on the spade 26*a*. That is, by some means such as a negative input pulse at terminal 27, the spade 26a and cathode potentials were made substantially equal and a beam was formed between the cathode 24 and the spade 26a. Once the beam impinges on the spade 26a, current flow through the resistor 28 connected to that spade results in a potential drop sufficient to lower the spade potential near to the cathode potential and thus maintain the beam at that position even though the external means for forming and directing the beam to spade 26a to be removed. This results in a stable locked-in position of the beam. Most of the beam, however, impinges on the target 32a, and the resultant voltage drop across the target resistor 36 constitutes the output signal.

The beam is switched to a semi-stable position by the application of a negative pulse to the input terminal 42. This momentarily lowers the potential on the switching electrode 38a and the switching plate 40a. The effect of the lowering of the potential on the switching electrode is to cause the electron beam which is locked in on spade 26a to spread. When the beam spreads, it impinges on the spade electrode 26b, causing current flow through its spade resistor 28 thereby lowering the potential on the spade 26b to the cathode potential. This causes the beam to advance to the leading edge of spade 26b and lock in at that point, while the negative pulse or input signal potential is applied. Since the switching plate 40a is negative and approximately in the same relative position as the switching electrode 28 so far as the adjacent spades are concerned, it might be expected that the beam would spread, as it does, actually, and switch to spade 26c. It should be recalled, however, that spade 26c is an unstable state spade tied directly to the source of positive potential 34, so the potential on the spade 26c cannot fall to lock the beam in position. Thus the beam cannot advance around spade 26c by this action alone. Further, while both the channel plate 50a and the switching plate 40a are negative, electrons from the beam cannot pass through the passageway or channel formed by the two plates. However, in response to the trailing edge or positive level of the input signal as the negative trigger pulse ends, the potential on the switching plate 40a rises to its positive value and the potential difference then existing between the switching plate 40a and the channel plate 50a has a value which permits the electron beam to pass to its unstable state. The beam thus passes through the channel and impinges on the bistable spade 26d to cause the potential on the spade 26d to drop because of the current flow through its load resistor, and, therefore, the beam advances to the leading edge of the spade 26d. Thus, the beam is in its second stable output position and impinges on target 32b. The means for advancing the beam back to its first position (at spade 26a) from spade 26d is the same as for advancing the beam from spade 26a to 26d, since the two "halves" of the tube are the same in structure and in operation.

It should be noted that the switching depended only upon the fact that the input signal exceeded a minimum duration and negative value (determined by the potential required to spread the beam so part of it would impinge on the advance spade and by the potential required to close the channel between the channel plate and the switching plate to the passage of electrons) and did not require critical maximum wave shape or duration of the input signal. Moreover, regardless of the wave shape of the input signal, the output signal is a square (or rectangular) wave having substantially vertical slope due to the fast switching characteristics of the tube. Further, since no feedback is involved, the input and output load impedances are determined only by the requirements of the apparatus with which the flip-flop is coupled. Likewise, the regulation of the supply voltages is not critical, since small changes in potential have but negligible effect on the switching characteristics of the flip-flop.

The spade resistors can be included within the tube envelope, if desired to minimize the effects of stray capacities and thus increase the upper limit of beam switching speed. If a fixed input and output load impedance value were desired, the target and input impedances could also be incorporated into the tube structure within the envelope. Such an arrangement would permit even higher switching speeds due to the further lowered stray capacitance and would constitute a true plug-in flip-flop unit.

Figures 3, 4:
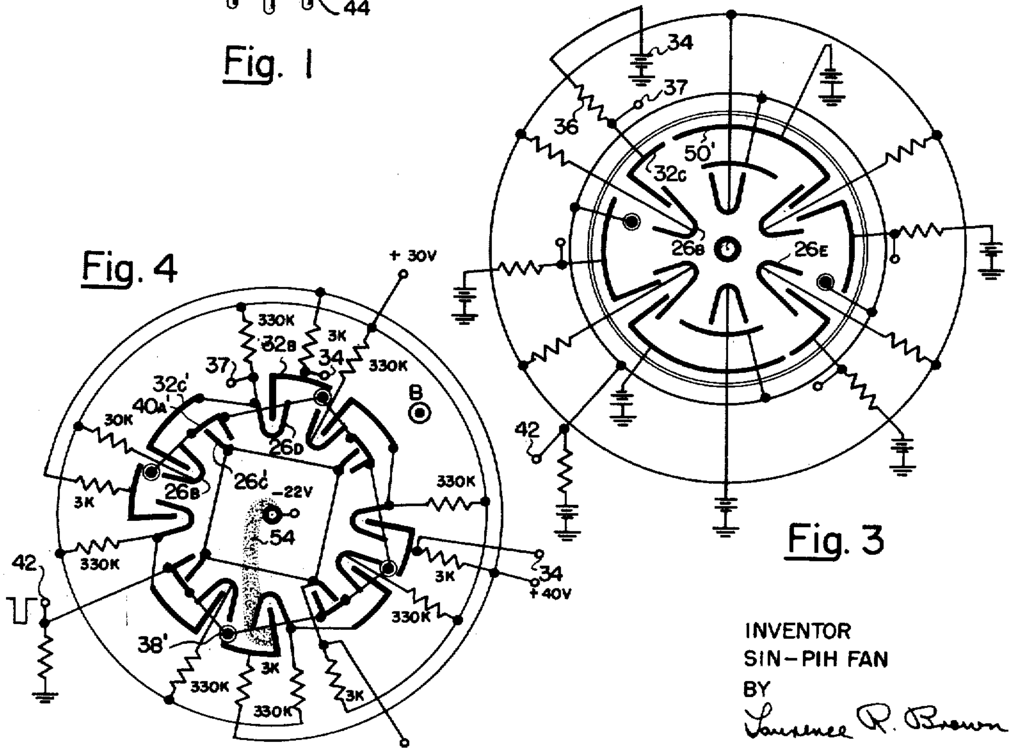
Fig. 3 is a sectional view of another beam switching tube embodying the present invention and having auxiliary output electrodes.
Fig. 4 is a sectional view of a multi-state beam switching tube and associated circuitry representing an alternative structural embodiment of the invention.

The tube shown in section in Fig. 3 is similar to the tube in Figs. 1 and 2 except that each of the channel plates 50 are broken up into channel plate 50' and a target electrode 32c. Channel plate 50' is biased as was channel plate 50a and 50b, but the targets 32c are connected to a source of positive potential 34 through a target resistor 36 as are the other targets. Thus, in event an output signal is desired at the point where the beam is locked in on the spade 26b or 26e, such is available at terminal 37 across the target resistors of these targets. The passage of the electrons through the channel between the switching plate and the channel plate is governed, as are the other beam forming and switching operations, as described in connection with the tube shown in Figs. 1 and 2.

The tube illustrated in Fig. 4 is similar to and functions the same as the tube shown in Fig. 3, except that the elements have different structural configuration and four stable output positions are provided rather than two positions as is the case with the former tube. While only four positions are indicated in the tube in Fig. 4, this is only by way of example. Tubes having more output positions, say 10, for example, are useful also as counter tubes or other beam switching tube applications, since for each input signal the electron beam advance is limited by virtue of the geometry of the tube, to one position. It is obvious that such techniques also may be employed with linearly oriented electrodes as well as with the coaxially arrayed electrodes of the embodiments shown.

In this embodiment the channel is formed by the switching plate 40a', target 32c' and the bistable spade 26b. Each auxiliary target 32c' is connected with the leading bistable spade 26d. Thus, as the beam is passed by the gate between spade 26b and channel plate 40a', it is received by target 32c' and this lowers the potential of spade 26d to cause the beam to proceed to its stable position on target 32b. The unstable state spades such as 26c' are simplified in construction. The beam 54 is shown in a locked-in position from which it is removed by a negative pulse applied to terminal 42 and thereby arriving at switching electrode 38'. The magnetic field flux B is indicated by the circle notation indicating that lines of flux proceed from the paper. Thus, the beam tends to progress in a clockwise direction. It is seen by comparison of this structure with the hereinbefore described embodiments that operation is similar.

Thus, the present invention teaches a novel method of operation of beam switching tubes, namely; the operational steps of causing the beam to proceed from a fixed stable position in static condition to a semi-stable position in response to a dynamic input condition in which it remains for the duration of the input condition when the beam is removed to an unstable position which directs the beam to a further stable static locked-in position.

As mentioned previously, former beam switching tubes required either input pulses of closely controlled regulation or else required external means, such as a flip-flop, connected to alternate switching electrodes to limit the beam advancement to but a single position. Both the flip-flop and pulse duration control means required external circuitry, precise timing requirements, or both. Therefore, an improved switching tube is provided by this invention which may be switched from one output position to the next in direct response to successive input trigger pulses of uncritical characteristics. Accordingly, those novel features believed descriptive of the nature and scope of the invention are defined with particularity in the appended claims.

What is claimed is:

1. A beam switching tube comprising in combination an elongated cathode, a plurality of elongated beam receiving electrodes spaced about the cathode and aligned parallel therewith, means providing a magnetic field having lines parallel with the cathode, a plurality of elongated beam forming electrodes aligned parallel with said cathode and positioned between said beam receiving electrodes and the cathode, means coupled to a sub-set of the beam forming electrodes for causing each electrode to individually hold the beam in a stable locked-in position relative thereto upon receipt of the beam, means connected with the remaining beam forming electrodes for causing them to receive the beam in an unstable condition without locking the beam in a stable locked-in position relative thereto, said electrodes in said sub-set being alternately disposed with the remaining beam forming electrodes, switching means adjacent each unstable condition beam forming electrodes responsive to negative potential levels of a stepping waveform to cause the beam to leave the stable locked-in position and enter the unstable position, structure defining a beam forming passageway about each unstable condition beam forming electrode, and electric field forming means coupled to said structure causing it to be responsive to positive potential levels of the stepping waveform and thereby permit passage of the beam to one of the electrodes in said sub-set.

2. In a magnetron beam switching tube having a plurality of target electrodes and beam forming electrodes, means coupled to a sub-set of stable state beam forming electrodes for holding the beam in a stable locked-in position, means coupled to the remaining beam forming electrodes for causing them to receive the beam in an unstable condition without locking-in the beam, each pair of two adjacent stable state electrodes being alternately disposed with a single unstable state beam forming electrode, switching means for causing the beam to progress from a stable one of the two adjacent stable positions to the other semi-stable position in response to one edge of a switching pulse, electric field forming structure including an unstable state beam forming electrode for directing the beam impinging on the semi-stable condition beam forming electrodes to stable state beam forming electrodes of the next adjacent pair, and means connecting at least a portion of said structure to direct the beam from the semi-stable state electrode to the stable state beam forming electrode in response to the other edge of said switching pulse.

3. A tube as defined in claim 2 having a target electrode between each pair of adjacent stable state electrodes for producing an output signal in response to beam current.

4. A tube as defined in claim 3 additionally having a target electrode positioned between the semi-stable state beam forming electrode and the adjacent unstable state beam forming electrode for receiving the beam in its semi-stable position.

5. A magnetron beam switching tube having a plurality of beam forming electrodes, means coupling a sub-set of the beam forming electrodes to hold the beam in a stable locked-in position, switching means for removing the beam from the stable locked-in position to a semi-stable position in response to a trigger pulse, means for receiving the beam in the semi-stable position as it is removed from the stable position for the duration of the trigger pulse, and means for advancing the beam to a further stable position at the expiration of the trigger pulse position from the semi-stable position.

6. A tube as defined in claim 5 wherein the means for removing the beam is an electrode positioned to deflect the beam responsive to the leading edge of an external trigger pulse, and the means for advancing the beam to a further stable position comprises two electrodes forming a passageway for passing the beam to an electrode in said sub-set in response to an electric field caused by a difference of potential of said two electrodes, and circuit means for establishing said electric field in response to the trailing edge of said trigger pulse.

7. In a multi-position magnetron beam switching tube having a plurality of separated stable beam forming means, electrode structure positioned to form an electric field gating passageway between two adjacent stable beam forming means for selectively advancing the beam from one stable beam position to the next in response to an applied electrical field, and a circuit connected to gate the beam through said passageway in response to one potential level of an external trigger pulse.

8. A tube as defined in claim 6 wherein a switching electrode is associated with each position of the beam, and circuit connections are made between the switching electrode and at least part of the electrode structure forming a passageway, and means are provided for coupling an external signal to said circuit connections to keep the electrodes in the same relative potential status.

9. The method of operating beam switching tubes comprising the steps of holding the beam in a fixed stable position in a static condition, sending the beam to a further semi-stable position in response to a dynamic input condition, holding the beam in the semi-stable position for the duration of the input condition, removing the beam to an unstable position upon cessation of the input condition, and thereby causing the beam to proceed automatically from the unstable position to a fixed stable position.

10. In a magnetron beam switching tube, a target, a first holding electrode positioned to hold the beam in a static locked-in position upon said target, an auxiliary holding electrode positioned to alter the beam position in response to an external trigger pulse, a gating electrode channel positioned between the holding and auxiliary electrodes for selectively passing the beam in response to an applied electrical field, and electrode structure for directing substantially the entire beam to said target in the static locked-in position in the absence of the trigger pulse.

References Cited in the file of this patent

UNITED STATES PATENTS

| | | |
|---|---|---|
| 2,513,260 | Alfven et al. | June 27, 1950 |
| 2,533,401 | Schramm | Dec. 12, 1950 |
| 2,591,997 | Backmark | Apr. 8, 1952 |
| 2,616,061 | Charton | Oct. 28, 1952 |
| 2,620,454 | Skellett | Dec. 2, 1952 |
| 2,706,248 | Lindberg et al. | Apr. 12, 1955 |

UNITED STATES PATENT OFFICE

CERTIFICATE OF CORRECTION

Patent No. 2,806,979 September 17, 1957

Sin-pih Fan

It is hereby certified that error appears in the printed specification of the above numbered patent requiring correction and that the said Letters Patent should read as corrected below.

Column 3, line 25, after "unstable" insert -- state --; column 5, line 71, for "electrodes" read -- electrode --; column 7, line 10, strike out "to", second occurrence.

Signed and sealed this 10th day of December 1957.

(SEAL)

Attest:

KARL H. AXLINE

Attesting Officer

ROBERT C. WATSON

Commissioner of Patents

U. S. DEPARTMENT OF COMMERCE

PATENT OFFICE

CERTIFICATE OF CORRECTION

Patent No. 2,806,979 September 17, 1957

Sin-pih Fan

It is hereby certified that error appears in the printed specification of the above numbered patent requiring correction and that the said Letters Patent should read as corrected below.

Column 10, line 7, strike out "position from the semi-stable position".

Signed and sealed this 11th day of March 1958.

(SEAL)
Attest:

KARL H. AXLINE
Attesting Officer

ROBERT C. WATSON
Commissioner of Patents